United States Patent [19]

Portnoy et al.

[11] Patent Number: 4,992,539
[45] Date of Patent: Feb. 12, 1991

[54] HIGH-VISCOSITY COLD-WATER-SWELLABLE GRANULAR STARCH

[75] Inventors: Norman A. Portnoy; James E. Eastman, both of Decatur, Ill.

[73] Assignee: A. E. Staley Manufacturing Company, Decatur, Ill.

[21] Appl. No.: 173,333

[22] Filed: Mar. 24, 1988

[51] Int. Cl.⁵ .................. C07H 15/04; C07G 17/00
[52] U.S. Cl. .................................. 536/120; 536/124
[58] Field of Search .............................. 536/120, 124

[56] References Cited

U.S. PATENT DOCUMENTS

| | | | |
|---|---|---|---|
| 2,523,709 | 9/1950 | Moe | 536/111 |
| 2,599,620 | 6/1952 | Filbert | 536/111 |
| 2,802,000 | 8/1957 | Caldwell | 536/111 |
| 2,853,484 | 9/1958 | Lolkema et al. | 536/111 |
| 4,452,978 | 6/1984 | Eastman | 536/111 |
| 4,465,702 | 8/1984 | Eastman et al. | 426/578 |
| 4,634,596 | 1/1987 | Eastman | 426/578 |

OTHER PUBLICATIONS

Radley, Starch and Its Derivative, pp. 152-163 (Chapman Hall, Ltd. 1969).
R. Whistler et al., "Starch" in Kirk-Othmer, Encyclopedia of Chemical Technology, vol. 21, pp. 492-507 (John Wiley & Sons, Inc. 3d ed., 1983).

Primary Examiner—Nathan M. Nutter
Attorney, Agent, or Firm—Michael F. Campbell; J. Daniel Wood

[57] ABSTRACT

A cold-water-swellable granular starch which affords aqueous solutions or dispersions having high-viscosity and/or excellent clarity is provided. In one embodiment, the granular starch is made cold-water swellable by contact with aqueous alcohol, then derivatized with an α-halocarboxylic acid, and then isolated under condition which inhibit esterification of the granular starch, e.g. high pH, to afford a starch that has excellent paste clarity. In other embodiments, the cold-water-swellable granular starch is crosslinked to afford a starch that has very high paste viscosity.

9 Claims, No Drawings

HIGH-VISCOSITY COLD-WATER-SWELLABLE GRANULAR STARCH

FIELD OF THE INVENTION

This invention relates to a method of producing a cold-water-swelling granular starch capable of yielding dispersions of high viscosity upon admixture with aqueous fluids at ambient temperatures.

BACKGROUND OF THE INVENTION

The production of starch derivatives for use as industrial thickeners of high viscosity has a long history. Examples of such thickeners are carboxymethyl starch ethers as disclosed in U.S. Pat. No. 2,523,709 (Moe). Moe discloses the use of an alcohol to precipitate a carboxymethyl ether derivative of starch from aqueous solution and thereby free the starch derivative from water soluble electrolytes. Moe discloses that very high viscosities can be obtained with relatively dilute aqueous solutions of such a product.

U.S. Pat. No. 2,802,000 (Caldwell) discloses granular, cold-water-soluble starch ether derivatives that are derivatized as a granular, non-liquid mass. The amount of base used by Caldwell to etherify the starch is the equivalent of the acid formed by etherification or only a slight excess so that the product is neutral or slightly alkaline. The product is described as birefringent; i.e. the granules exhibit the characteristic crosses when examined with a polarizing microscope.

U.S. Pat. No. 2,853,484 (Lolkema et al.) discloses reacting granular starch with a polyfunctional esterifying and/or etherifying agent (e.g. in aqueous caustic) and then subjected to a cold swelling process wherein the starch is pre-gelatinized (then optionally precipitated with solvents or inorganic salts) and dried.

U.S. Pat. No. 4,452,978 (Eastman) discloses granular starch hydroxypropyl ethers having reduced pasting temperatures, i.e. the temperature at which an aqueous dispersion of the granular starch ether will gelatinize is reduced, by etherifying in a liquid medium comprising a low alkanol.

Despite the availability of methods such as those described above of derivatizing starch, granular starch-based thickeners having properties equivalent to commercially available cellulosic thickeners have not generally been commercially available. Thus, it would be desirable to develop a method capable of producing such a starch-based thickener.

SUMMARY OF THE INVENTION

In one aspect, this invention relates to a method of preparing a granular cold-water-swelling starch having improved clarity in aqueous solution or dispersion comprising:

(a) contacting a granular starch with aqueous alcohol for a time and at a temperature sufficient to increase the ability of said starch to swell in water, wherein insufficient water is present in said aqueous alcohol to gelatinize said granular starch;

(b) etherifying said contacted granular starch in an alkaline aqueous slurry with an α-halocarboxylic acid or salt thereof wherein insufficient water is present in said aqueous alcohol to gelatinize said granular starch; and (c) isolating said etherified granular starch from said slurry under conditions which inhibit crosslinking thereof.

This method allows one to prepare a starch-based thickener having moderate viscosity and excellent clarity in aqueous solution of dispersion.

This invention relates to a method of preparing a granular cold-water-swelling crosslinked starch comprising:

(a) contacting a granular starch with aqueous alcohol for a time and at a temperature sufficient to increase the ability of said starch to swell in water, wherein insufficient water is present in said aqueous alcohol to gelatinize said granular starch;

(b) crosslinking said etherified granular starch to a degree sufficient to measurably increase the viscosity of an aqueous dispersion thereof, but insufficient to render said granular starch non-swelling in cold water.

This method allows one to prepare a starch-based thickener having unusual thickening properties, e.g. a low solids aqueous solution or dispersion having a viscosity equivalent to a cellulosic thickener, but without the need for toxic crosslinking agents and/or expensive electrolyte removal operations, e.g. dialysis. While crosslinking generally adversely affects clarity, high viscosities can be obtained with relatively little haze.

In a preferred embodiment, a V-form granular starch is etherified in an alkaline slurry with monochloroacetic acid (or its salt) which is subsequently at least partially neutralized, e.g. with acetic acid, and dried with heat (e.g. above ambient temperature) to cure the granular carboxymethyl starch and thus produce a crosslinked granular carboxymethyl starch.

DETAILED DESCRIPTION OF THE INVENTION

The method of this invention begins with the treatment of a native starch to increase the ability of the starch to swell in water. The ability of a starch granule to swell in cold-water, e.g. water at room temperature, can be correlated to the degree of V-form crystallinity of the dried granule. In general then, a granular starch having a non-V-form crystalline region, e.g. an A-form or B-form crystalline region, is treated with aqueous alcohol to convert at least a portion of the crystalline region to the V-form. The crystalline form of a starch can be found by X-ray crystallography as discussed in Radley, *Starch and Its Derivatives*, pp. 152–163 (Chapman and Hall, Ltd., 1968) and the references cited therein. The A-form crystalline region is most commonly found in the common cereal starches such as dent corn, wheat, oat, rice, etc. The preferred granular starch is native granular starch derived from dent corn by wet milling thereof. Examples of sources of starch in the B-form crystalline state include potato, high-amylose maize, wrinkled pea, Passiflora, and Canna.

In general, the conversion of the non-V-form crystalline regions to the V-form enhances the cold-water solubility and/or swelling ability ("swellability") of the granular starch. Thus, a measurement of cold-water solubility or swellability can generally be used in lieu of X-ray crystallography to detect the occurrence and measure the degree of conversion. Cold-water solubility is conveniently determined by mixing a known weight of starch in a measured volume of distilled water at room temperature with a Waring blender, centrifuging the starch suspension and weighing the residue obtained by evaporation of a measured aliquot of the supernatant liquid. The cold-water solubility of the sample is expressed as % solubles, dry solids basis (dsb).

The treatment of the starch to increase its ability to swell in cold water (hereinafter referred to as "conversion") is generally accomplished by contacting the granular starch with an aqueous alcohol, said contacting occurring for a time and at a temperature sufficient to achieve the desired degree of conversion. In general, substantially complete conversion is desired and, thus, the following description will be largely devoted to techniques which can be used to accomplish the same.

In the preferred embodiments, a native granular starch is first slurried in a liquid medium comprised of water and an alcohol selected from ethanol, n-propanol and isopropanol and then heated under pressure above the boiling point of the slurry for a time sufficient to achieve the desired degree of conversion, but insufficient to otherwise degrade the granular starch.

In specific, preferred embodiments, the first step in carrying out the process is the preparation of a slurry comprised of about 10 to about 25 parts by weight dry substance basis (dsb) of a granular corn starch in a liquid medium comprised of about 50 to about 75 parts by weight of an alcohol selected from ethanol, denatured ethanol, propanol and isopropanol and about 13 to about 30 parts by weight of water, provided that the liquid medium for the slurry contains about 15 to about 35% by weight of water inclusive of the water in the starch (i.e., the weight ratio of alcohol to water is about 5.7:1 to 1.9:1). Preferably the slurry is comprised of about 12 to about 20% by weight of starch (dsb) and about 17 to about 30% water.

The aforedescribed slurry of granular corn starch in an aqueous alcohol medium is heated to a temperature of about 300° to about 360° F. under autogenic pressure for about 1 to about 30 minutes. The heating process can be conducted as a batch process in a sealed vessel or as a continuous or semi-continuous process by passing the slurry through a heated confined zone at a rate calculated to give a residence time for the slurry in the heated zone of about 1 to about 30 minutes. Preferably the starch slurry is heated to a temperature of about 315° to about 350° F. for a period of about 1 to about 10 minutes to convert the ungelatinized corn starch to the present cold-water-swelling starch having high cold-water solubility. In a most preferred embodiment of the present process, the ungelatinized corn starch slurry contains about 12 to about 20% by weight of starch (dsb) and the liquid medium for the slurry contains about 18 to about 26% by weight of water (i.e., the weight ratio of alcohol to water is about 4.6:1 to 2.8:1); conversion of the ungelatinized corn starch to the present cold-water-swelling-/soluble starch is accomplished by heating the slurry to a temperature of about 325° to about 340° F. for a period of about 2 to about 5 minutes.

After the heating step, the slurry can be cooled to below about 120° F., and the product cold-water-swelling granular starch is separated from the liquid medium component of the slurry by filtration or centrifugation. Following the recovery of the starch product from the reaction slurry, the starch can be washed with 1 or more volumes of the alcohol used in the process, and dried and/or desolventized by conventional methods. For example, the starch can be dried in an oven to a certain volatiles level and then contacted with a hot humid gas, preferably moist air or steam, while the starch is maintained at a temperature from about 100° to about 250° F. for a time sufficient to reduce the alcohol content of the starch to the desired level. Alternatively, the slurry, or a wet filter cake or wet centrifuge cake, can be etherified and/or treated with a crosslinking agent, both as discussed below. For example, in preferred embodiments, aqueous caustic and additional alcohol are added to the cooled slurry of granular starch in aqueous alcohol after the conversion step is completed. The caustic catalyzes the reaction of the granular starch with an etherifying crosslinking agent such as an α-halocarboxylic acid.

After conversion, the cold-water-swelling granular starch is etherified with an α-halocarboxylic acid and/or crosslinked. To obtain a cold-water-swelling granular starch that will afford aqueous solutions or dispersions of the greatest clarity, the granular starch should be etherified but not significantly crosslinked, e.g. reacted with an α-halocarboxylic acid under alkaline conditions and then isolated under alkaline conditions which inhibit crosslinking.

The cold-water-swelling granular starch can be crosslinked by reaction with a crosslinking agent. A "crosslinking agent" as used herein is any polyfunctional compound capable of reacting with a plurality of the hydroxyl groups of the anhydroglucose units of the starch by replacing active hydrogen atoms of a portion of the hydroxyl groups with covalent bonds to the crosslinking agent. Examples of such crosslinking agents include polyetherifying agents (e.g. epichlorohydrin), polyesterifying agents (e.g. organic diacids or halides, anhydrides or esters thereof such as malic acid, adipic acid, and the like, or inorganic acids such as phosphoric acid, phosphorous oxychloride, and the like). A preferred crosslinking agent is an α-halocarboxylic acid or an alkali or alkaline earth salt thereof, e.g. sodium or potassium chloro- or bromo-acetic acid, which is first reacted with starch under alkaline conditions to etherify the starch and then is cured to esterify and thereby crosslink the starch.

Very efficient crosslinking agents, e.g. phosphorous oxychloride, can be used at relatively low levels, e.g. from about 0.01% to about 1% by weight of the granular starch. While these levels will typically sufficiently crosslink the granular starch, the degree of substitution (D.S.) may be insufficient to prevent retrogradation of the starch which may be undesirable. Accordingly, the starch can be derivatized to prevent retrogradation, for example by etherification, e.g. with an alkylene oxide (e.g. propylene oxide), to a D.S. of from about 0.01 to about 1.

As noted briefly above, in certain embodiments the granular starch is crosslinked, after the conversion, by virtue of reaction of the granular starch with an esterifiable crosslinking agent, i.e. an α-halocarboxylic acid, which is first reacted with starch under alkaline conditions to etherify the starch and is then cured under acidic conditions to esterify the starch and thereby crosslink the starch.

The level of crosslinkable etherifying agent should be sufficient to measurably increase the clarity and/or viscosity of an aqueous solution or dispersion of the starch, but should not be sufficient to adversely affect the cold-water solubility or dispersibility of the starch. Typical levels will range from a D.S. of about 0.1 to about 1, preferably a D.S. of about 0.15 to about 0.3.

The etherification of a granular starch with a crosslinkable etherifying agent such as an α-halocarboxylic acid will typically be accomplished under alkaline conditions, e.g. at a pH of greater than about pH 9. If exceptional clarity is desired in the aqueous solutions of dispersions of the product, the granular starch should be isolated under conditions of high pH to inhibit crosslinking of the granular starch. If, however, relatively greater viscosity is desired at the expense of a loss of clarity, the pH of the slurry should be lowered with a proton-donating acid and the granular starch dried and/or desolventized. The loss of clarity can be slight if the conditions under which the granular starch is dried are relatively mild, e.g. temperatures below about 150° F. If extremely high viscosity solutions or dispersions are desired without regard to clarity, the granular starch can be dried under relatively harsh conditions, e.g. heating at temperatures over about 200° F. and/or steam sparging of the granular starch to remove residual alcohol. Care should be taken to avoid over-curing of the granular starch which can decease the viscosity and, in extreme cases, render the starch non-swelling in cold water. The product workup can be otherwise similar to the conventional workup of granular, cold-water-swelling starches.

Because the conversion of the granular starch will increase its cold water swellability, and derivatization (e.g. etherification with chloroacetic acid) may do so as well, the amount of water in and the temperature of the crosslinking medium should be adjusted in relation to the non-hydrating solvents and/or hydration inhibiting salts to prevent gelatinization of the granular starch during crosslinking. The following examples will illustrate suitable reaction conditions which can be varied to achieve equivalent results without under experimentation.

The cold-water-swelling, crosslinked, granular starches will find utility as a thickener in many of the areas in which modified cellulosic thickeners are commonly used. Examples include industrial thickeners and/or suspending agents, e.g. in coating formulations such as latex paints and in petroleum well fracturing fluids and the like, as well as non-industrial thickener uses.

The following examples serve to illustrate the invention without limitation, variations of the invention within the skill of those in the art being within the spirit and scope of this invention.

EXAMPLES

The determination of the cold-water solubility of the starch samples can be carried out by the following specific procedure involving mixing a starch samples with water in a Waring blender; centrifuging the mixture, evaporating an aliquot of the supernatant liquid and weighing the residue as solubles. The equipment utilized in measuring cold-water solubility is as follows:

(1) Waring blender (Model PB5) equipped with semi-micro monel metal cup (Fisher Scientific Catalog No. 14-509-07);

(2) International Centrifuge Model K or similar;

(3) Centrifuge tubes, 100-ml, and evaporating dish; and (4) Balance.

The cold-water solubility measurement is carried out according to the following procedure;

1. Measure exactly 100-ml of distilled water at ambient temperature into the Waring blender cup.

2. Turn the blender on slow speed (about 6100 rpm) and add 1.000 gram of starch sample over less than a 15 second period, then stir for 2 minutes on high speed (about 13,500 rpm).

3. Fill a 100-ml centrifuge tube with the starch solution/suspension and centrifuge at maximum speed (3100 rpm is satisfactory) for 15 minutes.

4. Transfer a 25-ml aliquot of the supernatant to a tared evaporating dish and evaporate on a steam bath to apparent dryness.

5. Dry in an oven at 110° C. for at least 1 hour (overnight is satisfactory) and weigh.

Cold-water solubility, expressed as percent water solubles (dsb), is then calculated according to the following formula:

$$\% \text{ water solubles } (dsb) = \frac{(\text{wt. of solids in 25 ml}) \times 4}{(\text{wt. of sample}) \times \frac{(\% \text{ Moisture})}{100}} \times 100$$

EXAMPLE I

This Example illustrates the preparation of the improved carboxymethyl starch of this invention.

An unmodified common corn starch was pretreated as follows. The following ingredients, all at room temperature (20° C.), were added to a stainless steel vessel: 2100 ml ethanol, 493 g water, and 600 g unmodified common corn starch having a moisture content of about 12 wt. %. The vessel was then sealed and slowly heated (about 5° C./min.) with stirring to 320° F., (160° C.). The temperature was maintained for 3 minutes and the mixture was then slowly cooled to 140° F. (60° C.).

The cooled, pretreated starch was carboxymethylated as follows. The following ingredients were then added to the vessel: 2100 ml ethanol at 20° C., 93.0 g sodium hydroxide in 200 g ice water, and 111.0 g chloroacetic acid in 300 g ethanol and 50 g water at 20° C. This mixture was then slowly heated with stirring to 185° F. (85° C.). The temperature was maintained for 45 minutes to permit the reaction to proceed to equilibrium.

The reaction was terminated by adding 8.2 g acetic acid to the mixture and cooling to 100° F. (38° C.). The temperature was maintained for 1 hour.

The carboxymethyl starch was recovered by centrifuging the mixture and washing the filter cake twice with 2 liter mixtures of 85 wt. % ethanol and 15 wt. % water. The starch was then air dried.

The starch was then acid-cured as follows. Thirty grams of the starch were slurried in 200 ml ethanol, 30 g water, and 3.0 g acetic acid at 20° C. The slurry was filtered and the recovered starch was dried in an oven at 57° C. for 72 hours.

Approximately 2 g of the pretreated, carboxymethylated, and acid-cured starch were then used to prepare aqueous starch solutions at 20° C. using deionized water. Viscosity measurements of the solutions were taken and the results are shown in Table I in the column after crosslinking. For comparative purposes, the air-dried granular starch was used to prepare aqueous starch solutions at 20° C. using deionized water. The viscosity of these solutions is shown in the column "No Curing".

TABLE I

Viscosity of Aqueous Starch Solutions-
Pretreated and Acid-Cured

| WT. % STARCH IN SOLUTION | BROOKFIELD VISCOSITY NO CURING | (cps at 20 rpm) AFTER CURING |
|---|---|---|
| 0.5 | 800 | 2000 |
| 1.0 | 2000 | 6350 |
| 1.5 | 2900 | 7500 |
| 2.0 | 3750 | 9850 |

COMPARATIVE EXAMPLE A

This Example illustrates the importance of pretreating in preparing the improved carboxymethyl starch of this invention.

A carboxymethyl starch was prepared as in Example I except that the original mixture (2100 ml ethanol, 493 g water, and 500 g corn starch) was not heated to 160° C. Instead, it remained at 20° C. until the carboxymethylating step. The results are shown in Table II.

TABLE II

Viscosity of Aqueous Starch Solutions-
No Pre-Treatment

| WT. % STARCH IN SOLUTION | BROOKFIELD VISCOSITY BEFORE DRYING | (cps at 20 rpm) AFTER DRYING |
|---|---|---|
| 0.5 | 225 | 650 |
| 1.0 | 550 | 900 |
| 1.5 | 750 | 1300 |
| 2.0 | 900 | 1700 |

A comparison of the viscosity from Tables I and II shows that pretreatment is very important for maximizing viscosity.

EXAMPLE II

This Example illustrates the importance of acid-curing in preparing the improved carboxymethyl starch of this invention.

A carboxymethyl starch was prepared as in Example I except that the acid-curing was omitted. In other words, after the carboxymethylating reaction was terminated and the starch washed and dried, it was slurried in 200 ml ethanol and 30 g water, but without any acetic acid. The results are shown in Table III.

TABLE III

Viscosity of Aqueous Starch Solutions-
No Acid-Curing

| WT. % STARCH IN SOLUTION | BROOKFIELD VISCOSITY BEFORE DRYING | (cps at 20 rpm) AFTER DRYING |
|---|---|---|
| 0.5 | 500 | 600 |
| 1.0 | 1100 | 1200 |
| 1.5 | 1700 | 1750 |
| 2.0 | 2250 | 2000 |

A comparison of the viscosities from Tables I and III shows that acid-curing is very important for maximizing viscosity.

EXAMPLE III

The effect of desolventizing at high temperatures is shown below in Table IV. A carboxymethyl starch prepared in a manner similar to that of Example I was dissolved in deionized water to prepare aqueous solutions at the solids levels shown in Table IV. One series of samples were used as a low-heat dried cake, i.e. not desolventized. The slurries of the other samples were neutralized to the pH shown in Table IV prior to filtration and heating at 220° F. for 2 hours to desolventize the granular starch samples.

TABLE IV

Effect of Desolventization and pH Thereof on Viscosity of
Aqueous Solutions of Carboxymethyl Granular Starch

| % Solids | Not Desolventized (CPS at 20 rpm) | Desolventized at pH: (cps at 20 rpm) | | | |
|---|---|---|---|---|---|
| | | 6.5 | 7.5 | 8.5 | 9.5 |
| 0.50 | 240 | 0 | 0 | 0 | 100 |
| 1.0 | 3250 | 0 | 0 | 10 | 3560 |
| 1.5 | 7600 | 0 | 1140 | 105 | 13000 |
| 2.0 | 11160 | 0 | 3940 | 850 | 21000 |
| 3.0 | 15060 | 340 | 31150 | 13400 | — |
| 4.0 | 20800 | 3710 | — | — | — |
| 5.0 | — | 13000 | — | — | — |
| Clarity: | Clear | Cloudy | Cloudy | Cloudy | Clear |

— Not measured

As can be seen from Table IV, acidifying past pH 9.5 caused overcrosslinking and thus inhibition of the granular starch by desolventizing at low slurry pH; e.g. pH 6.5, while desolventizing alkaline filter cake, e.g. pH 9.5, gave the highest viscosity solution at 2% solids.

What is claimed is:

1. A method of preparing a granular cold-water-swelling starch having improved clarity in aqueous solution or dispersion comprising:
   (a) contacting a granular starch with aqueous alcohol for a time and at a temperature sufficient to increase the ability of said starch to swell in water, wherein insufficient water is present in said aqueous alcohol to gelatinize said granular starch;
   (b) etherifying said contacted granular starch in an alkaline aqueous slurry with an α-halocarboxylic acid or salt thereof wherein insufficient water is present in said aqueous alcohol to gelatinize said granular starch; and
   (c) isolating said etherified granular starch from said slurry under conditions which inhibit crosslinking thereof.

2. A method of claim 1 wherein said contacting comprises slurrying a native granular starch in aqueous alcohol and heating said slurry above the atmospheric boiling point thereof under sufficient pressure to maintain contact between at least a portion of said aqueous alcohol and said granular starch for a time sufficient to convert substantially all of the starch crystallinity thereof to the V-form.

3. A method of claim 1 wherein said isolating comprises retaining said slurry at an alkaline pH and separating said granular starch from the slurry by filtration or centrifugation.

4. A method of claim 1 wherein said granular starch is etherified with an amount of said α-halocarboxylic acid or salt thereof that is sufficient to provide a degree of substitution of about 0.1 to about 1.

5. A method of claim 1 wherein said α-halocarboxylic acid or salt thereof is selected from the group consisting of chloroacetic acid, bromoacetic acid, and alkali or alkaline earth salts thereof.

6. A method of preparing a granular cold-water-swelling crosslinked starch comprising:
   (a) contacting a granular starch with aqueous alcohol for a time and at a temperature sufficient to increase the ability of said starch to swell in water, wherein insufficient water is present in said aqueous alcohol to gelatinize said granular starch; and (b) etherifying said granular starch with an etherifying agent having one or more chemical moieties capable of esterifying said granular starch and subsequently esterifying said granular starch through at least a portion of said one or more chemical moieties, said etherifying and subsequent esterifying being sufficient to measurably increase the viscosity of an aqueous dispersion thereof, but insufficient to render said granular starch non-swelling in cold water.

7. A method of claim 1 wherein said granular starch is etherified with an α-halocarboxylic acid or salt thereof in a slurry of an alkaline pH and said esterifying comprises adding an acid to said slurry of etherified granular starch, separating said etherified granular starch from said slurry by filtration or centrifugation and drying said etherified granular starch at a temperature above ambient temperature.

8. A method of claim 6 wherein said contacting comprises slurrying a native granular starch in aqueous alcohol and heating said slurry above the atmospheric boiling point thereof under sufficient pressure to maintain contact between at least a portion of said aqueous alcohol and said granular starch for a time sufficient to convert substantially all of the starch crystallinity thereof to the V-form.

9. A method of preparing a granular cold-water-swelling crosslinked starch comprising:

(a) slurrying a native granular starch in aqueous alcohol and heating said slurry above the atmospheric boiling point thereof and sufficient pressure to maintain contact between at least a portion of said aqueous alcohol and said granular starch for a time sufficient to convert substantially all of the starch crystallinity thereof to the V-form, (b) etherifying said slurried granular starch with an α-halocarboxylic acid or salt thereof to a degree of substitution at about 0.1 to about 1.0 in a slurry at an alkaline pH having insufficient water to gelatinize said granular starch, (c) adding a proton-donating acid to said etherified granular starch, separating said granular starch from said slurry and drying said granular starch at a temperature above ambient temperature to esterify said granular starch.

* * * * *